(12) United States Patent
Halbritter et al.

(10) Patent No.: US 11,220,071 B2
(45) Date of Patent: Jan. 11, 2022

(54) COMPOSITE PART COMPACTION DEVICE

(71) Applicant: The Boeing Company, Chicago, IL (US)

(72) Inventors: Allen James Halbritter, Charleston, SC (US); Edward Ray Duncan, Goose Creek, SC (US)

(73) Assignee: The Boeing Company, Chicago, IL (US)

( * ) Notice: Subject to any disclaimer, the term of this patent is extended or adjusted under 35 U.S.C. 154(b) by 139 days.

(21) Appl. No.: 16/176,257

(22) Filed: Oct. 31, 2018

(65) Prior Publication Data
US 2020/0130294 A1  Apr. 30, 2020

(51) Int. Cl.
*B29C 70/34* (2006.01)
*B29C 70/54* (2006.01)
*B29K 307/04* (2006.01)
*B29L 31/30* (2006.01)

(52) U.S. Cl.
CPC ............ *B29C 70/345* (2013.01); *B29C 70/54* (2013.01); *B29K 2307/04* (2013.01); *B29L 2031/3076* (2013.01)

(58) Field of Classification Search
CPC ....... B29C 70/345; B29C 70/54; B29C 70/42; B29C 2043/3211; B29C 2043/147; B29C 33/30; B29C 33/405; B29C 33/34; B29C 33/202; B29C 2043/3613; B29C 2043/3639; B29C 43/361; B29C 33/20; B29C 33/40; B29C 43/14; B29C 43/32; B29C 43/36; B29K 2307/04; B29K 2105/06; B29K 2105/0872; B29K 2105/08; B29L 2031/3076; B29L 2031/30
See application file for complete search history.

(56) References Cited

U.S. PATENT DOCUMENTS

| | | | | |
|---|---|---|---|---|
| 2007/0164463 A1* | 7/2007 | Kasono | ................. | G11B 7/263 264/2.7 |
| 2011/0006460 A1* | 1/2011 | Wei | ........................ | B29C 43/36 264/403 |
| 2012/0153531 A1* | 6/2012 | Rober | ..................... | B29C 43/56 264/225 |
| 2014/0216642 A1* | 8/2014 | Childress | ................ | B32B 37/10 156/272.2 |

(Continued)

FOREIGN PATENT DOCUMENTS

| | | |
|---|---|---|
| EP | 3251821 A1 | 12/2017 |
| JP | 2011083975 A | 4/2011 |

OTHER PUBLICATIONS

Composite Material; Wikipedia; Oct. 22, 2018.
(Continued)

*Primary Examiner* — Michael N Orlando
*Assistant Examiner* — Abhishek A Patwardhan
(74) *Attorney, Agent, or Firm* — Duft & Bornsen, PC

(57) ABSTRACT

Systems and methods are provided for compacting laminates. One embodiment is a method for compacting a laminate onto a surface of a forming tool. The method includes placing the laminate onto the forming tool, disposing a compaction device over the laminate, gripping the compaction device to the forming tool, compacting the laminate with a pressure foot of the compaction device, and removing the compaction device from the forming tool.

20 Claims, 14 Drawing Sheets

(56) References Cited

U.S. PATENT DOCUMENTS

2017/0348937 A1\* 12/2017 Linde .................... B29C 70/46
2018/0229406 A1\* 8/2018 Takano .................. B29C 43/10

OTHER PUBLICATIONS

Search and Examination Report; Application GB1912831.3; dated May 19, 2020.
GB Office Action; Application No. GB1912831.3; dated Feb. 24, 2021.

\* cited by examiner

COMPOSITE PART COMPACTION DEVICE

FIELD

The disclosure relates to the field of composite materials, and in particular, to fabrication of composite parts.

BACKGROUND

Composite parts, such as Carbon Fiber Reinforced Polymer (CFRP) parts, may be laid-up as a laminate of constituent materials which are compacted and hardened (e.g., cured) in order to provide strength. Current compaction techniques involve applying a laminate to a mandrel, placing a vacuum bag over the laminate and the mandrel, sealing the vacuum bag in place, and applying atmospheric pressure that presses the vacuum bag onto the laminate. Sealing the vacuum bag in place is a time-consuming and labor-intensive process.

Therefore, it would be desirable to have a method and apparatus that take into account at least some of the issues discussed above, as well as other possible issues.

SUMMARY

Embodiments described herein provide for handheld pneumatic and/or electromagnetic devices which are capable of compacting small laminates such as details, without the use of a vacuum bag. For example, embodiments described herein may grip a mandrel or other forming tool via the application of magnetic force, and may shape a laminate onto the mandrel by applying pneumatic pressure to the laminate while maintaining the grip. One embodiment is a method for compacting a laminate onto a surface of a forming tool. The method includes placing the laminate onto the forming tool, disposing a compaction device over the laminate, gripping the compaction device to the forming tool, compacting the laminate with a pressure foot of the compaction device, and removing the compaction device from the forming tool.

A further embodiment is a non-transitory computer readable medium embodying programmed instructions which, when executed by a processor, are operable for performing a method for compacting a laminate onto a surface of a forming tool. The method includes placing the laminate onto the forming tool, disposing a compaction device over the laminate, gripping the compaction device to the forming tool, compacting the laminate with a pressure foot of the compaction device, and removing the compaction device from the forming tool.

A further embodiment is an apparatus for compacting a laminate onto a surface of a forming tool. The apparatus includes a body that houses an actuatable ram that applies compressive forces, a pressure foot mechanically coupled with the ram and that includes a flexible base dimensioned to cover the laminate while applying compressive forces to the laminate, a gripping device that controllably applies gripping forces between the apparatus and the forming tool, and a controller that maintains a static equilibrium between the gripping forces and the compressive forces.

Yet another embodiment is a method for laying up a composite preform. The method includes placing a laminate comprising at least one ply of fiber reinforced material onto a surface of a forming tool, compacting the laminate to the forming tool by controllably applying compaction forces to the laminate while maintaining gripping forces between a compaction device and the forming tool, laying up at least one ply atop the compacted plies at the forming tool, and repeating the steps of compacting and placing.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform or laminate. Individual fibers within each layer of the preform are aligned parallel with each other, but different layers may exhibit different fiber orientations in order to increase the strength of the resulting composite along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
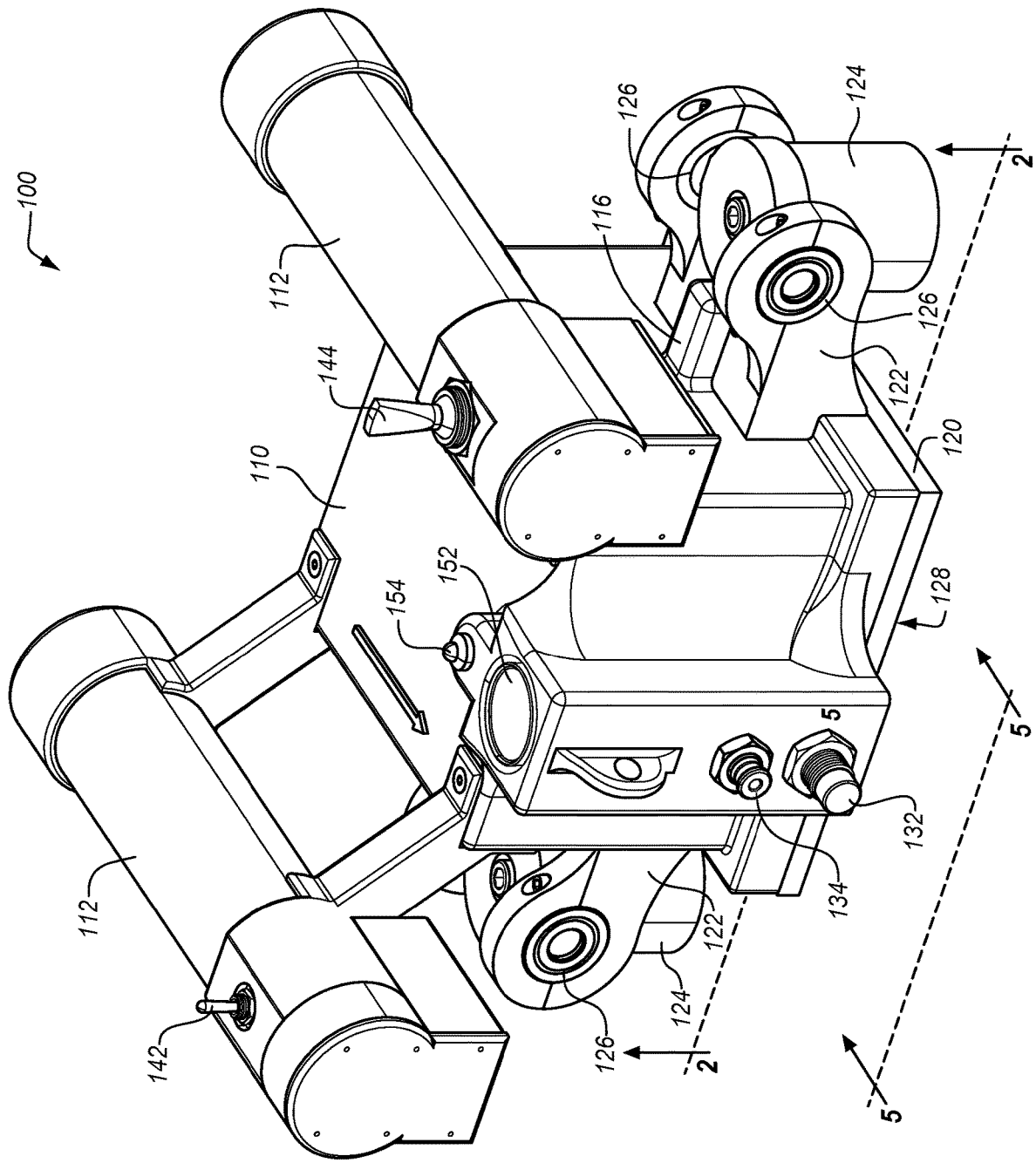
FIG. 1 is a perspective view of a compaction device in an illustrative embodiment.

FIG. 1 is a perspective view of a compaction device 100 in an illustrative embodiment. Compaction device 100 comprises any system, device, or component operable to grip a forming tool and apply compaction pressure to a laminate while the grip is maintained. In this embodiment, compaction device 100 comprises body 110 and base 120. Base 120 includes lower frame 128, from which prongs 122 extend. Electromagnets 124 are mounted to prongs 122 via bearings 126 in order to enable electromagnets 124 to swivel or rotate in order to align with surface features (e.g., surfaces oriented at a constant angle) on a forming tool. In further embodiments, bearings 126 may enable swiveling of electromagnets 124 along multiple axes. Electromagnets 124 may be turned on or off in order to rapidly apply and/or remove gripping forces between compaction device 100 and a forming tool. This enables rapid securement of compaction device 100 to the forming tool, as well as rapid removal, which reduces time spent preparing to compact a laminate. Such features provide the technical benefit of reduced labor, particularly when compacting multiple small laminates such as details. While electromagnets 124 are illustrated in this embodiment, in further embodiments other gripping devices may be utilized such as clamps, suction cups, adhesive pads, etc.

Body 110 houses handles 112 which enable a technician to hold compaction device 100 against the forming tool, and, further includes electrical port 132 for receiving electrical power, pneumatic port 134 for receiving pressurized gas, and switch 142 for activating electromagnets 124. Light 154 indicates when electromagnets 124 are activated. Body 110 also includes switch 144 for driving a ram, piston, (or any other suitable component) internal to compaction device 100 that applies compressive forces to a laminate via a pressure foot. Dial 152 controls an amount of pressure applied by the ram, in order to ensure that force applied by the piston does not overcome gripping forces supplied by the electromagnets 124. The ram drives a pressure foot (e.g., pressure foot 200 of FIG. 2) to compact a laminate placed on the forming tool. In this embodiment, the ram is driven by pneumatic pressure. However, in further embodiments, the ram may be driven in response to hydraulic pressure, an electrical motor, etc. Body 110 also includes wire covers 116, which are disposed between prongs 122. Furthermore, body 110 maintains a static equilibrium between the gripping forces and the compressive forces discussed above.

Figure 2:
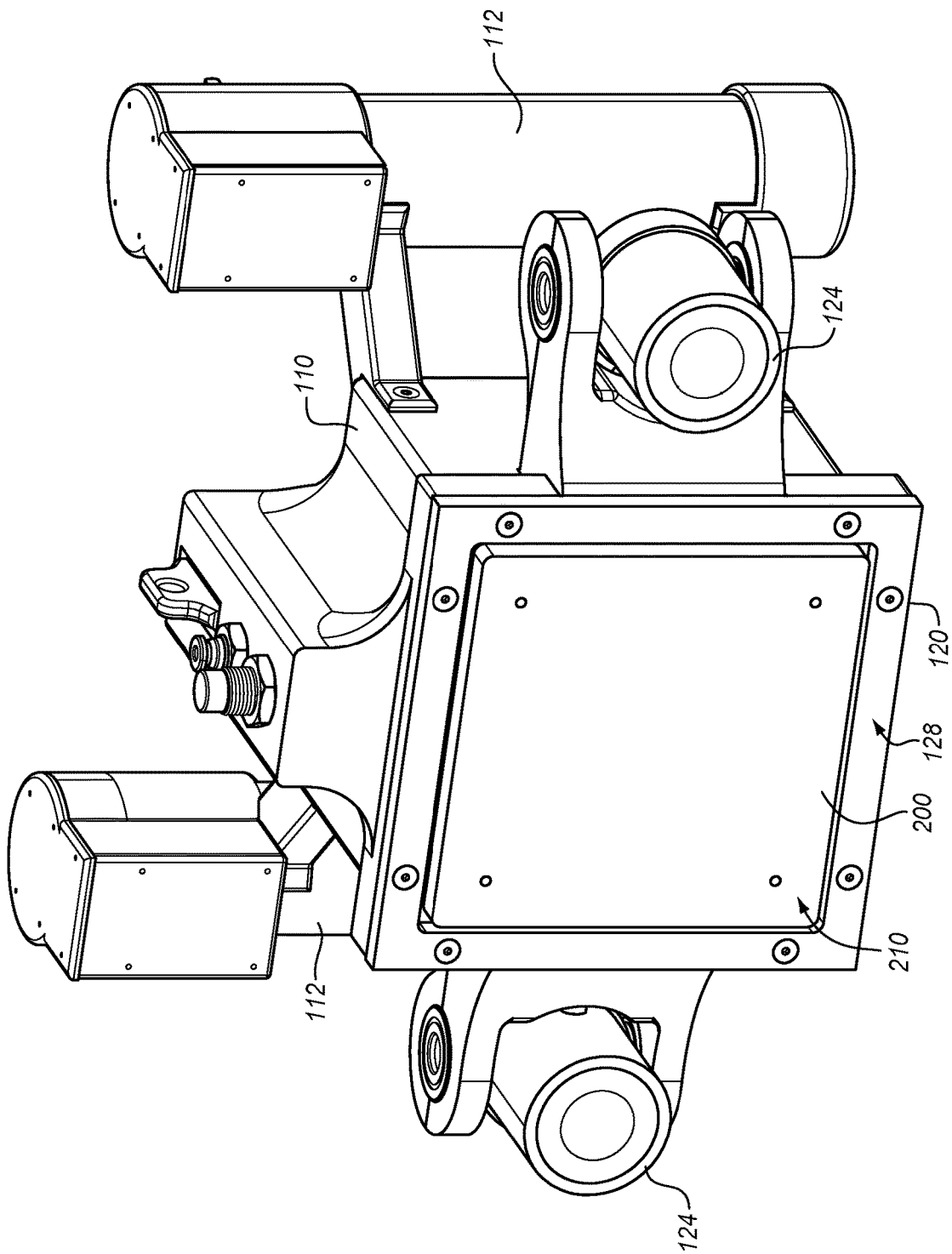
FIG. 2 is a further perspective view of a compaction device in an illustrative embodiment.

FIG. 2 illustrates a further perspective view of compaction device 100 in an illustrative embodiment, and corresponds with view arrows 2 of FIG. 1. FIG. 2 illustrates pressure foot 200, which is driven against a laminate in order to compact the laminate. Pressure foot 200 comprises any suitable flexible (e.g., elastic or deformable) material capable of conforming to one or more surface geometries on a forming tool. In order to facilitate compaction of a laminate against a variety of surface geometries, pressure foot 200 may be made from a stretchable material, such as a rubber or rubberized plastic. In this embodiment, pressure foot 200 also includes an indentation 210. Indentation 210 provides a technical benefit by facilitating flexion of pressure foot 200 during compaction processes.

Figure 3:
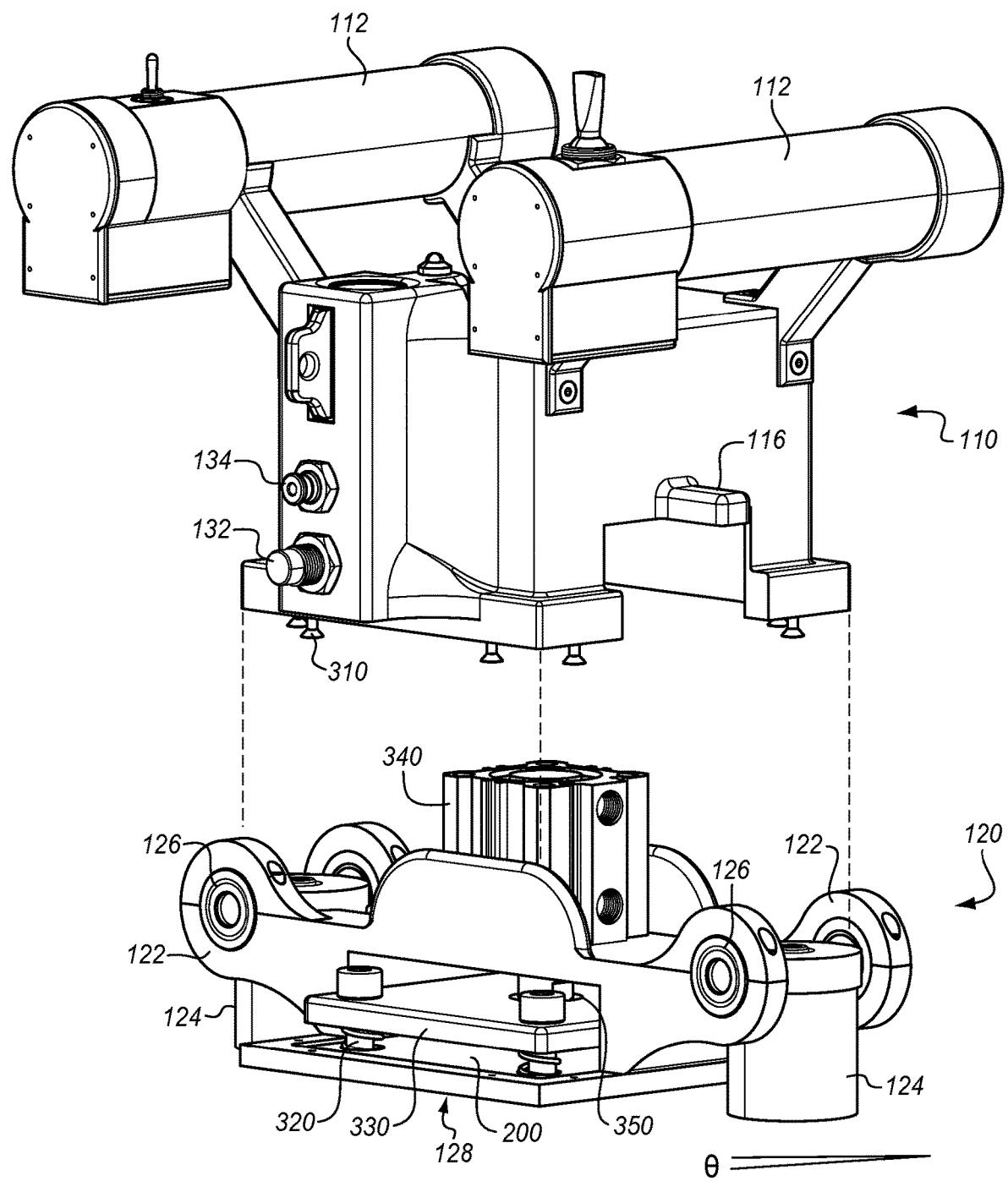
FIG. 3 is an exploded view of a compaction device in an illustrative embodiment.

FIG. 3 is an exploded view of compaction device 100 in an illustrative embodiment. FIG. 3 illustrates that base 120 is secured to body 110 via fasteners 310 (e.g., screws, bolts, etc.). FIG. 3 further illustrates that base 120 includes actuator 340. Actuator 340 (e.g., a pneumatic cylinder) drives ram 350 against plate 330. Plate 330 is interposed between the shock absorbers 320 and the ram 350, and is therefore coupled via shock absorbers 320 with pressure foot 200. Shock absorbers 320 are therefore mechanically coupled with pressure foot 200.

In this arrangement, because ram 350 is mechanically coupled with pressure foot 200, actuation of ram 350 drives pressure foot 200. Specifically, actuating the ram 350 drives plate 330 downward, which compresses the shock absorbers 320 that are mechanically coupled with the pressure foot 200 and that distribute load across the pressure foot 200. In embodiments where a surface of the forming tool is angled, driving of the ram 350 against plate 330 may adjust an angle of plate 330 (i.e., because shock absorbers 320 at different heights along the surface of the forming tool apply different amounts of force in response to forces from ram 350). For example, in FIG. 3 plate 330 is tilted at an angle θ due to forces applied via shock absorbers 320. This arrangement also provides a technical benefit by distributing forces applied by ram 350 across the area of pressure foot 200, which helps to ensure that forces are applied evenly to a laminate, even in situations where the laminate conforms to a complex contour. In this embodiment, ram 350 is driven by pneumatic pressure. This means that pressure foot 200 is driven in response to pneumatic pressure applied to the compaction device 100.

Illustrative details of the operation of compaction device 100 will be discussed with regard to FIG. 4. Assume, for this embodiment, that a technician has laid-up a laminate, and wishes to place the laminate onto a forming tool for compaction. Further assume that compaction device 100 has been coupled with a pressure reservoir supplying pneumatic pressure, and with an electrical power source.

Figure 4:
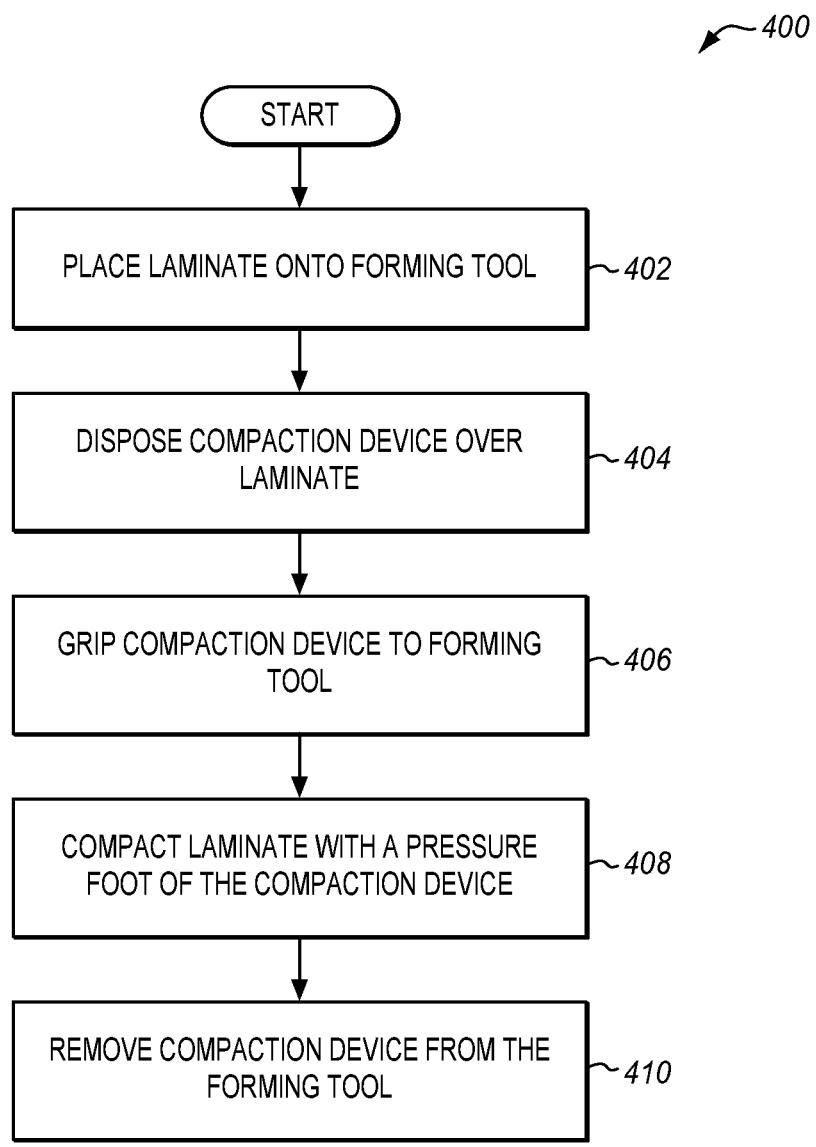
FIG. 4 is a flowchart illustrating a method for operating a compaction device to compact a laminate in an illustrative embodiment.

FIG. 4 is a flowchart illustrating a method 400 for operating a compaction device to compact a laminate in an illustrative embodiment. The steps of method 400 are described with reference to compaction device 100 of FIG. 1, but those skilled in the art will appreciate that method 400 may be performed in other systems. The steps of the flowcharts described herein are not all inclusive and may include other steps not shown. The steps described herein may also be performed in an alternative order.

Figure 5:
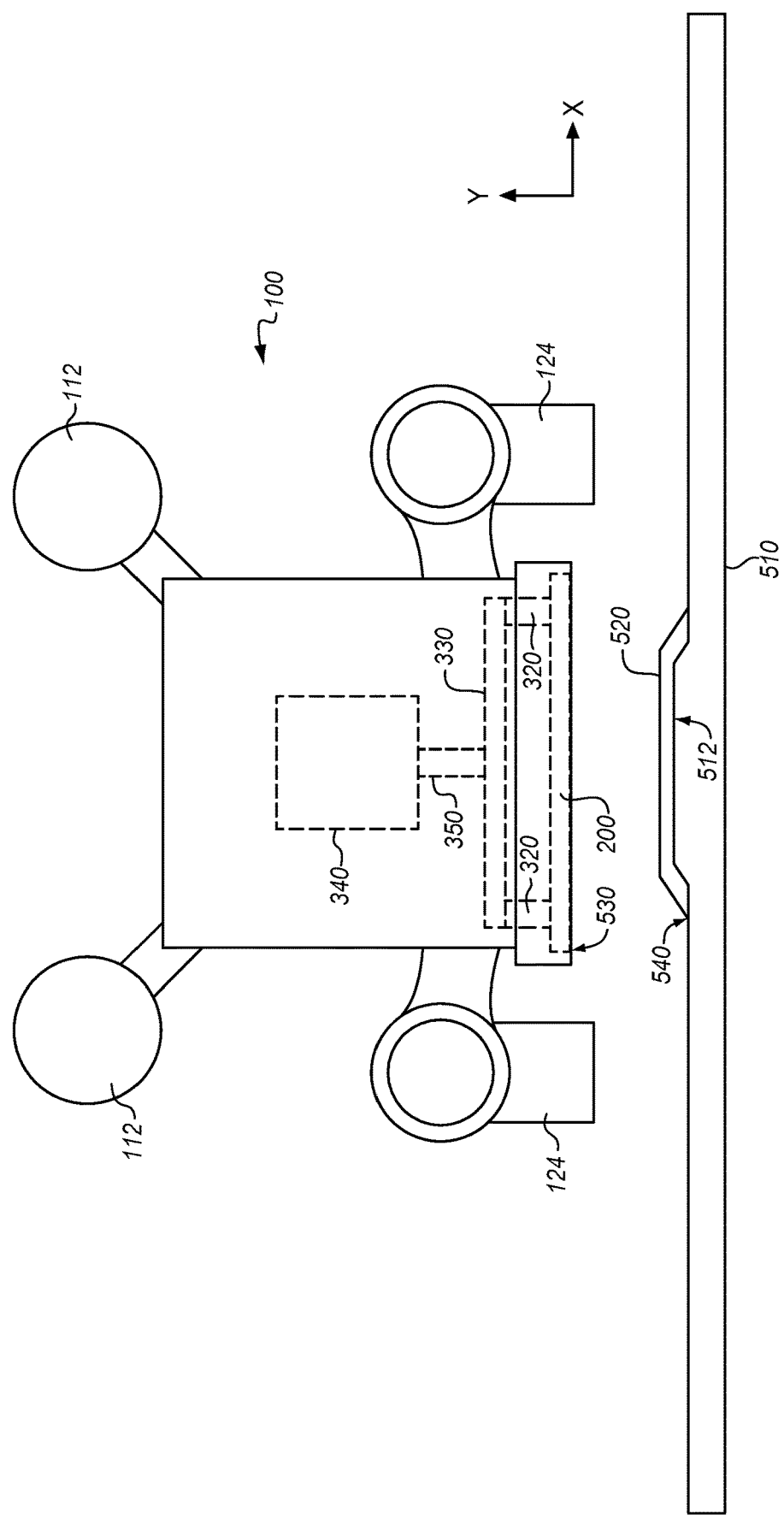
FIGS. 5-11 are side views illustrating a compaction device operating on a laminate in an illustrative embodiment

In step 402, the laminate is placed onto the forming tool. For example, as shown in FIG. 5 (which is a side view illustrated by view arrows 5 of FIG. 1), a laminate 520 may be placed over a forming tool 510 having a surface feature 512.

Figure 6:
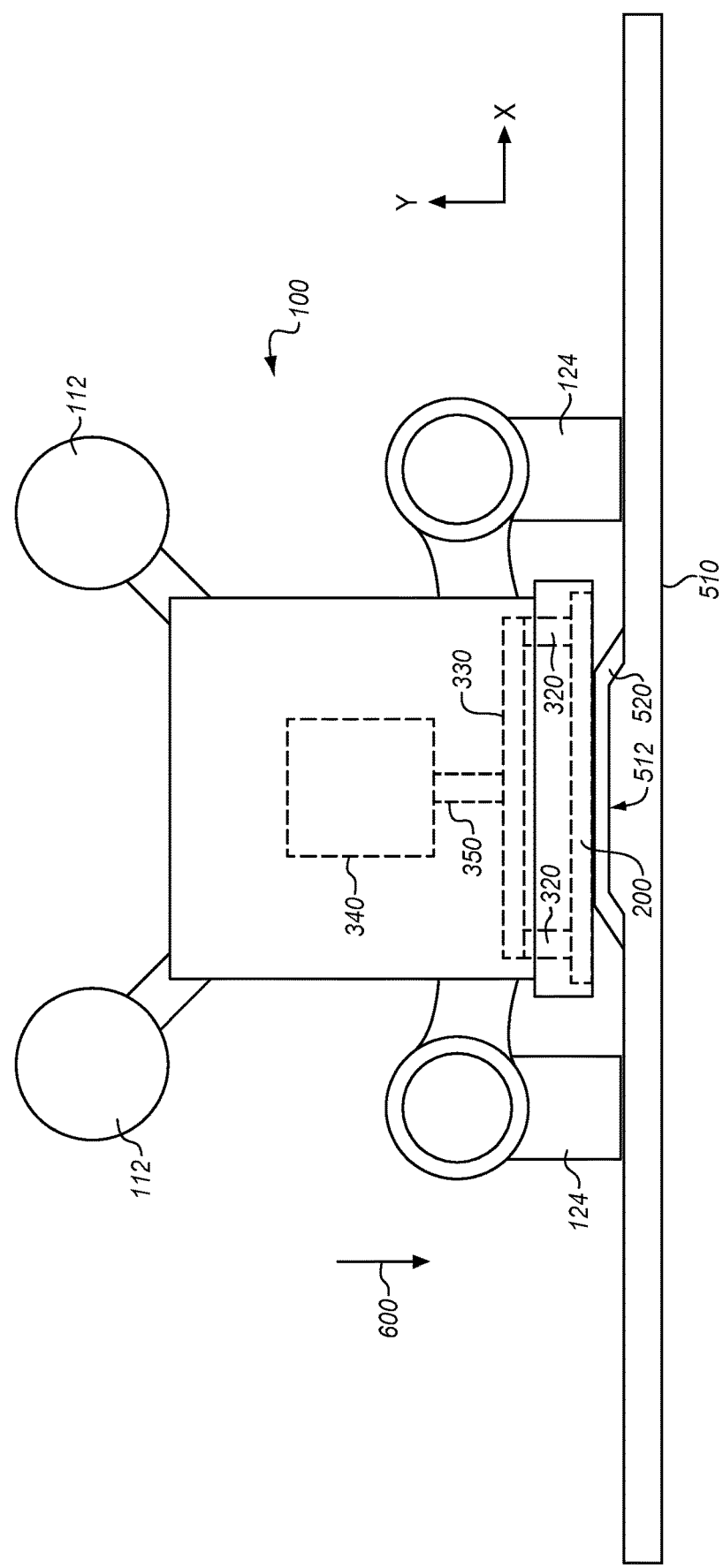

In step 404, compaction device 100 is placed over the laminate 520, for example such that pressure foot 200 covers the laminate 520. In FIG. 6, compaction device 100 is moved in direction 600 while pressure foot 200 is aligned to completely cover laminate 520. Thus, a perimeter 530 of pressure foot 200 may be dimensioned to equal or exceed a perimeter 540 of laminate 520. This enables pressure foot 200 to compact the entirety of laminate 520 at once.

Figure 7:
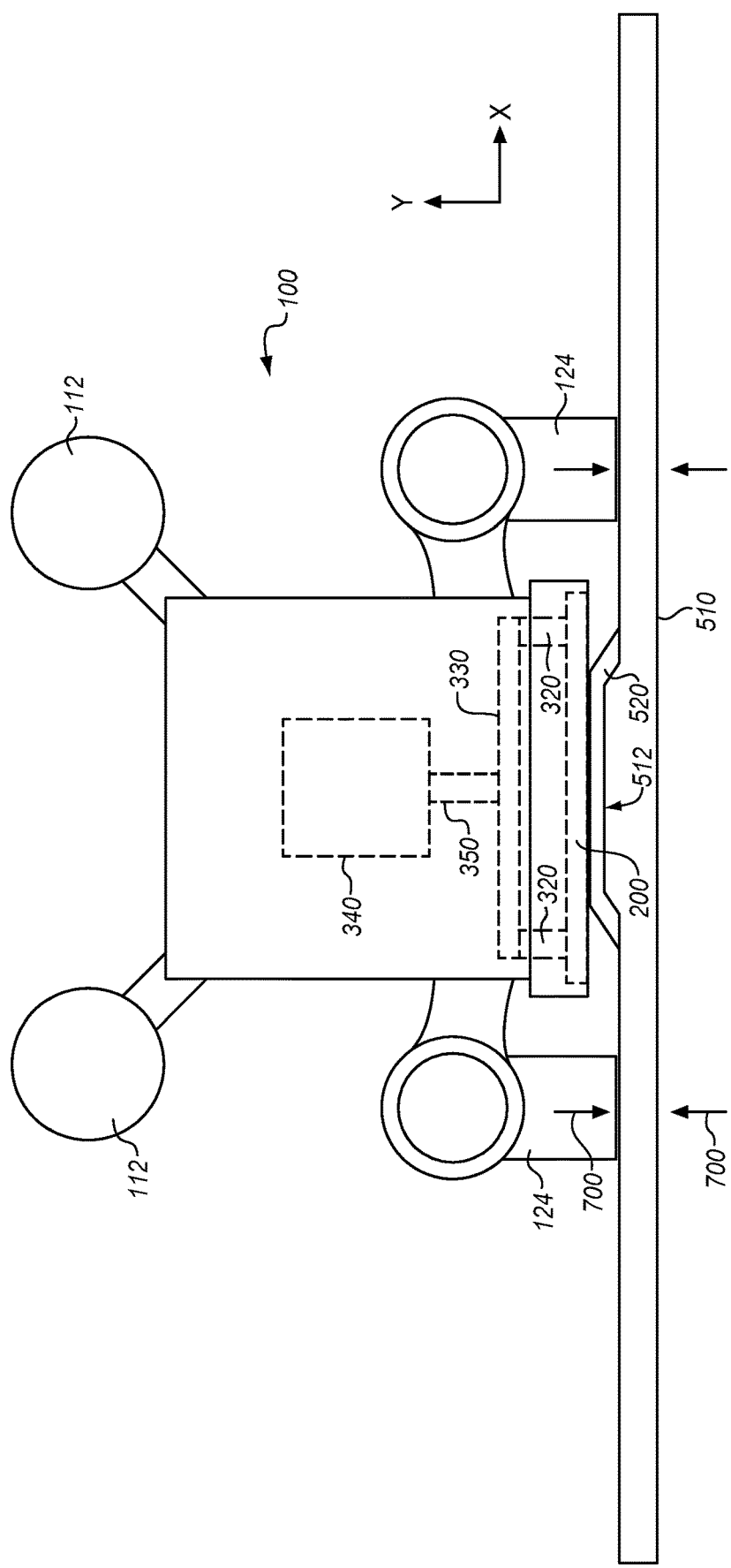

In step 406, switch 142 is activated, which supplies power to electromagnets 124. The electromagnets grip the compaction device 100 to forming tool 510 because forming tool 510 is magnetic (e.g., because it is made of steel or invar), resulting in an attractive force 700 between electromagnets 124 and forming tool 510, as shown in FIG. 7. With a grip applied by electromagnets 124, compaction device 100 remains stable over laminate 520. In further embodiments, the electromagnets may be located within the forming tool 510 itself, and be activated via a switch at the forming tool 510. In such an embodiment, electromagnets 124 may be replaced with materials that respond to magnetic forces, such as steel. In a further embodiment, gripping the compaction device 100 to the forming tool 510 may include activating electromagnets within the forming tool 510 that draw the compaction device 100 into contact with the forming tool 510.

Figure 8:
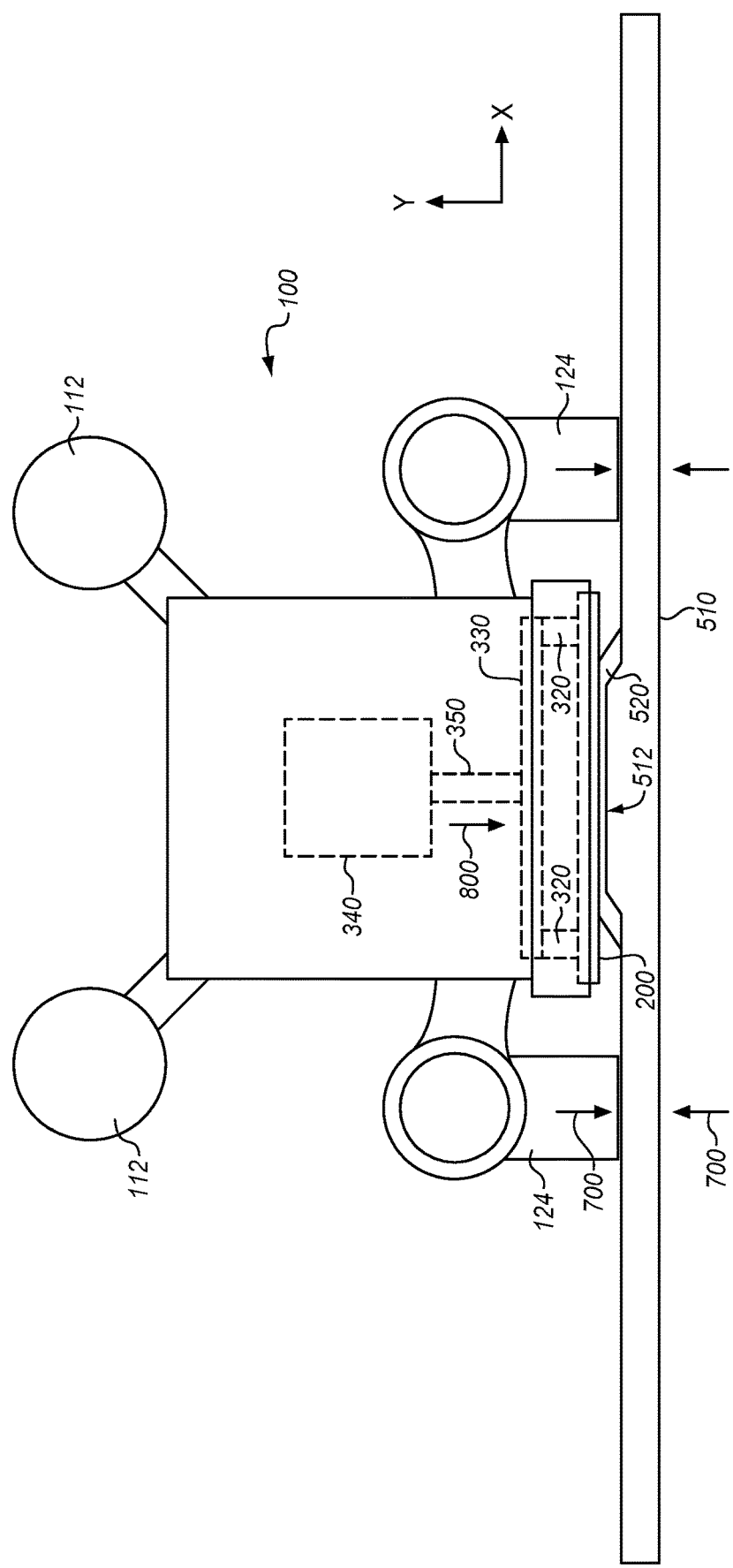
Figure 9:
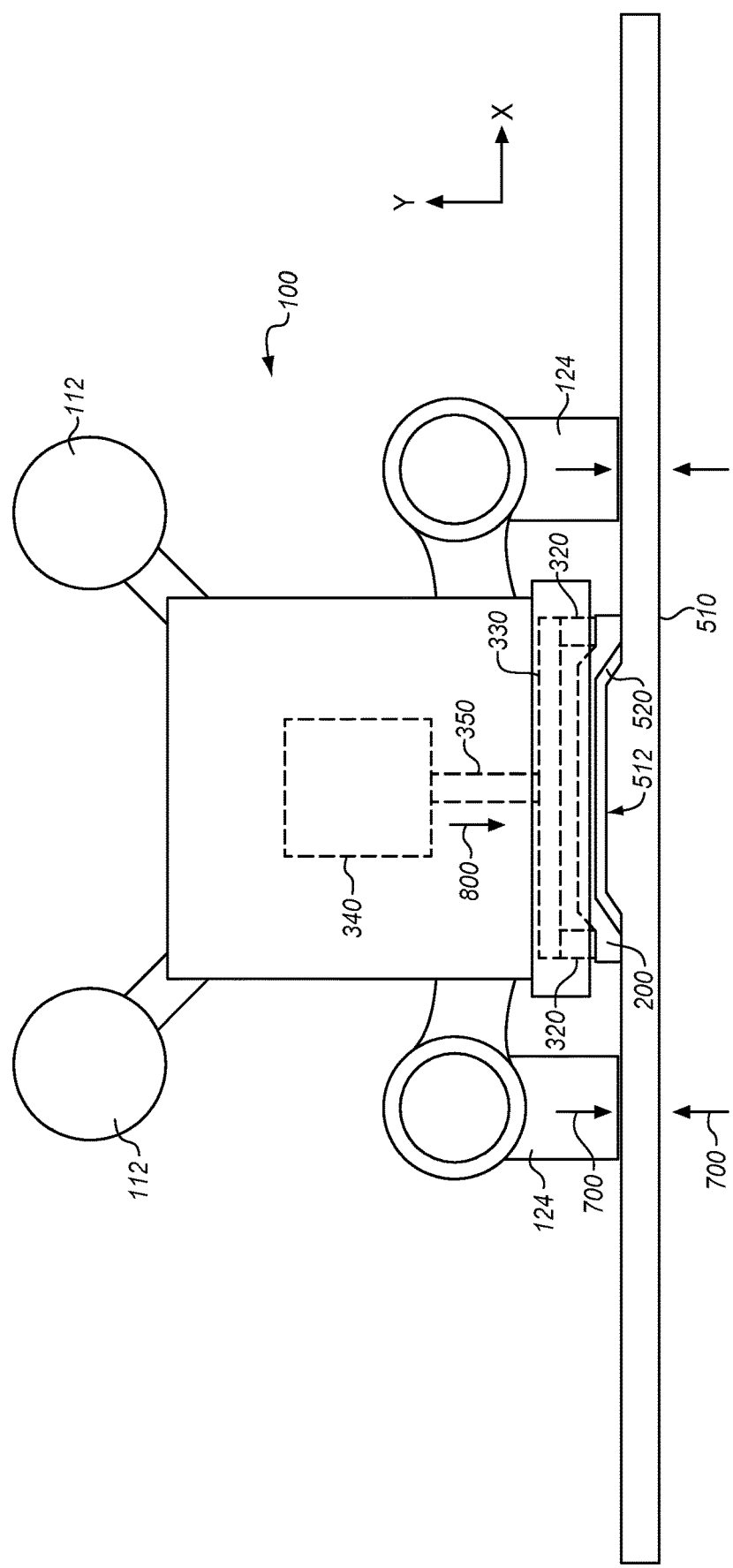

In step 408, laminate 520 is compacted via pressure foot 200, which is made of a flexible material. FIGS. 8-9 illustrate the progress of pressure foot 200 as compaction device 100 activates. For example, an operator of compaction device 100 may activate switch 144, which provides pneumatic pressure to ram 350 via actuator 340. This causes ram 350 to displace along direction 800, as shown in FIG. 8, driving pressure foot 200 against laminate 520 and therefore compacting laminate 520. In FIG. 9, ram 350 has continued to extend in direction 800, and pressure foot 200 has deformed around laminate 520, resulting in compaction forces being evenly applied to laminate 520 by pressure foot 200. During this process, forces applied by the pressure foot 200 are equal to or less than gripping forces supplied by the electromagnets 124. The compaction forces are applied evenly even though laminate 520 bends due to the surface feature 512 underneath it. This is a technical benefit caused by the flexibility of pressure foot 200.

Figure 10:
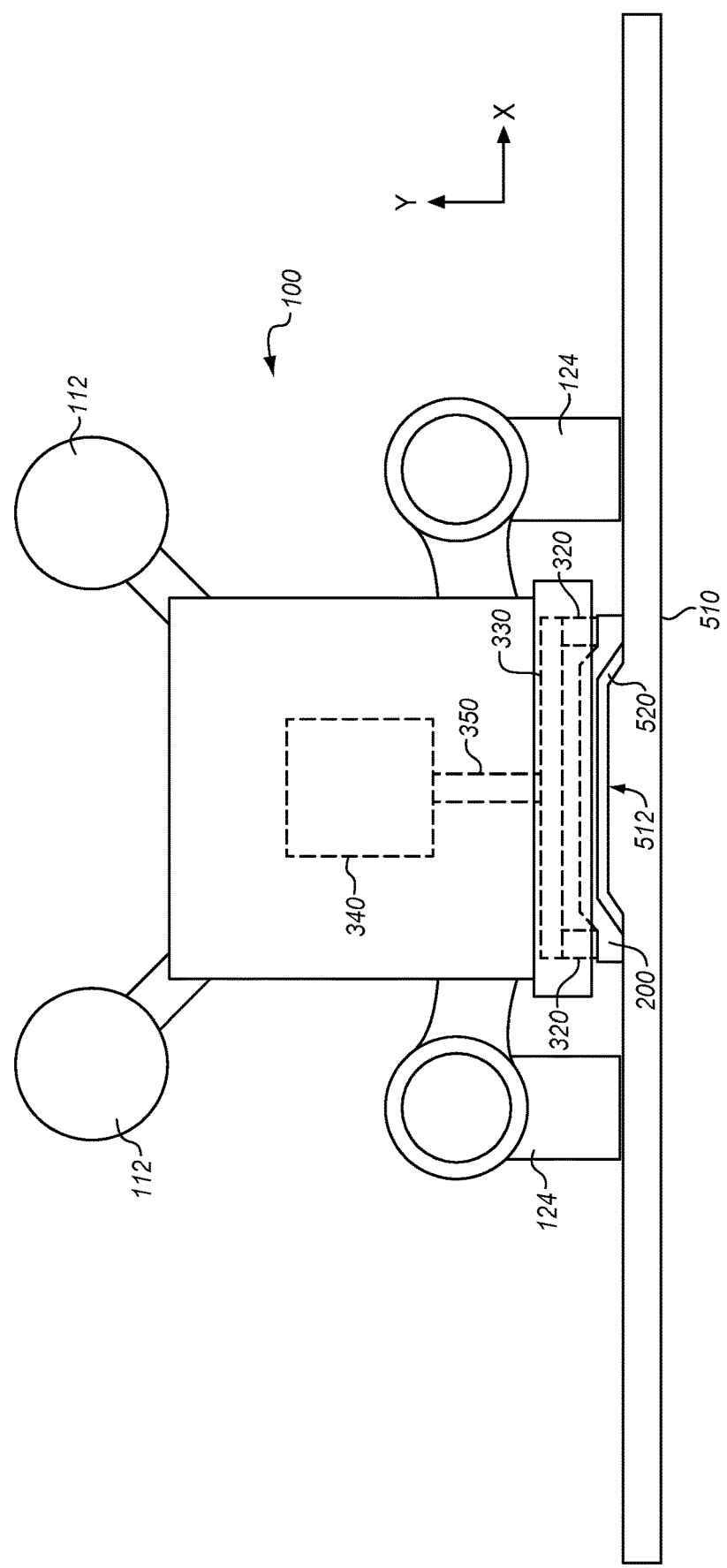
Figure 11:
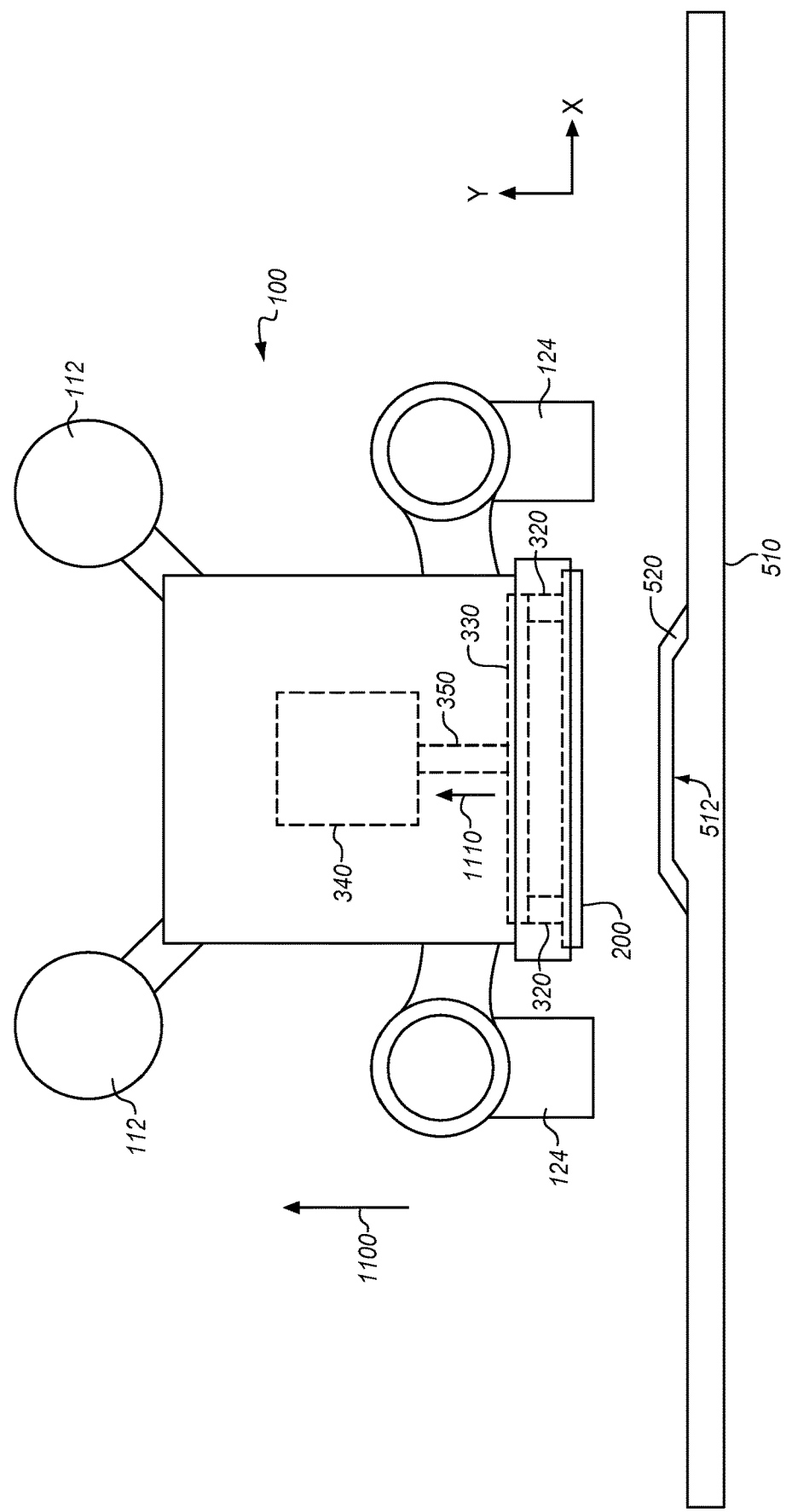

Compaction device 100 may be held or left in this compaction mode for any suitable length of time, such as for thirty seconds, for half an hour, etc. Eventually, compaction has completed. Switch 142 is deactivated, turning off electromagnets 124 and eliminating attractive force 700, as shown in FIG. 10. Compaction device 100 may then be removed in step 410 by lifting off of forming tool 510 in direction 1100, and flipping the switch 144. Flipping the switch 144 may reset ram 350 to an original position by moving ram 350 in direction 1110 of FIG. 11, or may halt application of pneumatic force to ram 350, which enables shock absorbers 320 to return ram 350 to a resting position. As shown in FIG. 11, laminate 520 is now compacted, ensuring that laminate 520 will exhibit a desired level of strength when it is hardened.

The operations discussed above may be repeated multiple times as the laminate 520 is built up with additional layers, and this may be especially valuable for laminates that exhibit complex contours. In such embodiments, compaction may be performed iteratively, each time a number of plies is added to the laminate during layup.

Figure 12:
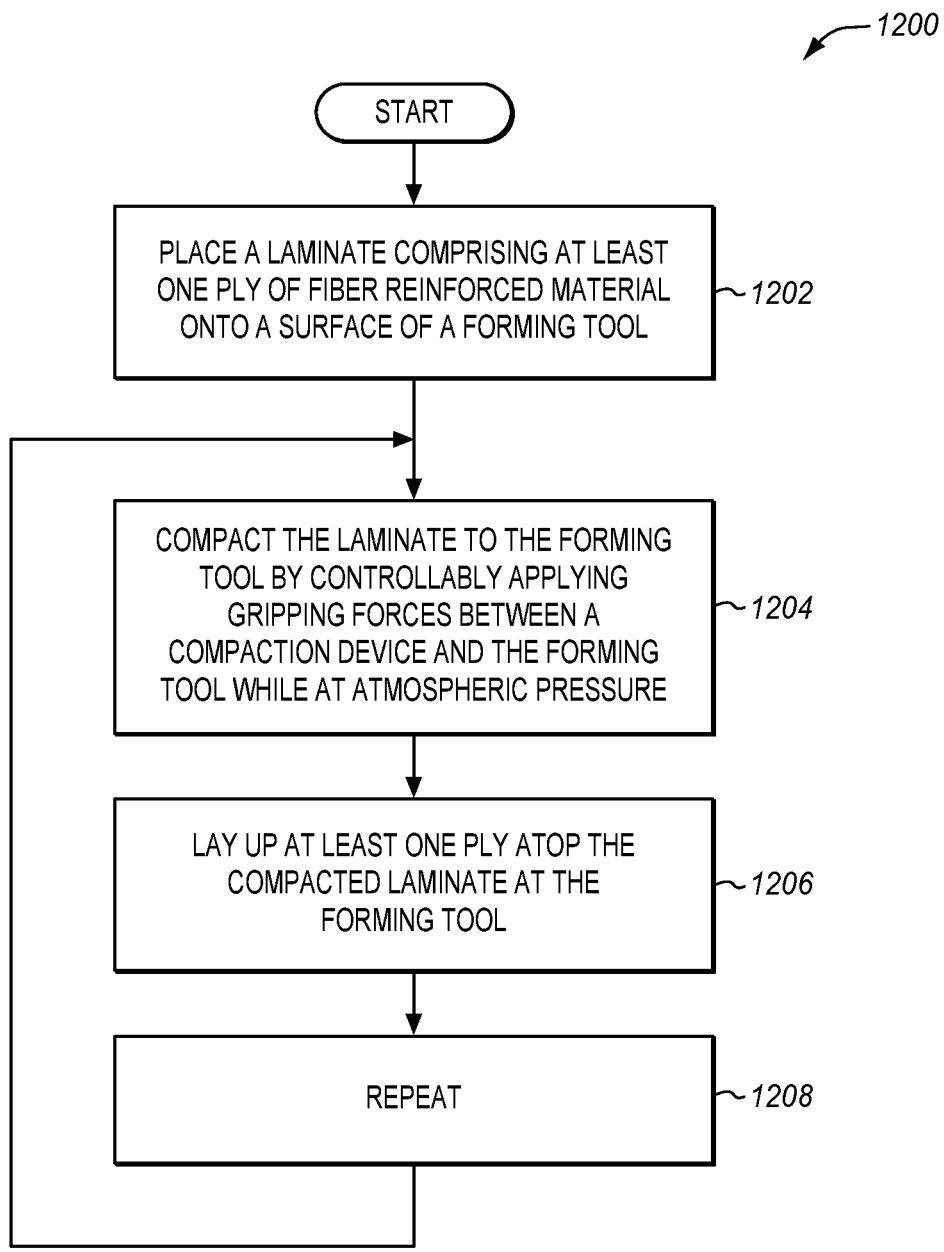
FIG. 12 is a flowchart illustrating a method for operating a compaction device to compact a laminate in an illustrative embodiment.

FIG. 12 illustrates a method 1200 for laying up a composite preform. The method includes placing a laminate comprising at least one ply of fiber reinforced material (e.g., ten plies) onto a surface of a forming tool in step 1202. In step 1204, the method includes compacting the laminate to the forming tool by controllably applying gripping forces between a compaction device and the forming tool while at atmospheric pressure (i.e., without the use of a vacuum bag). Step 1206 includes laying up at least one ply (e.g., a next ten plies) atop the compacted plies at the forming tool, and step 1208 includes repeating the steps of compacting and placing. Step 1208 may be performed any suitable number of times, depending on the number of layers in the laminate.

EXAMPLES

In the following examples, additional processes, systems, and methods are described in the context of a compaction device for laminates.

Figure 13:
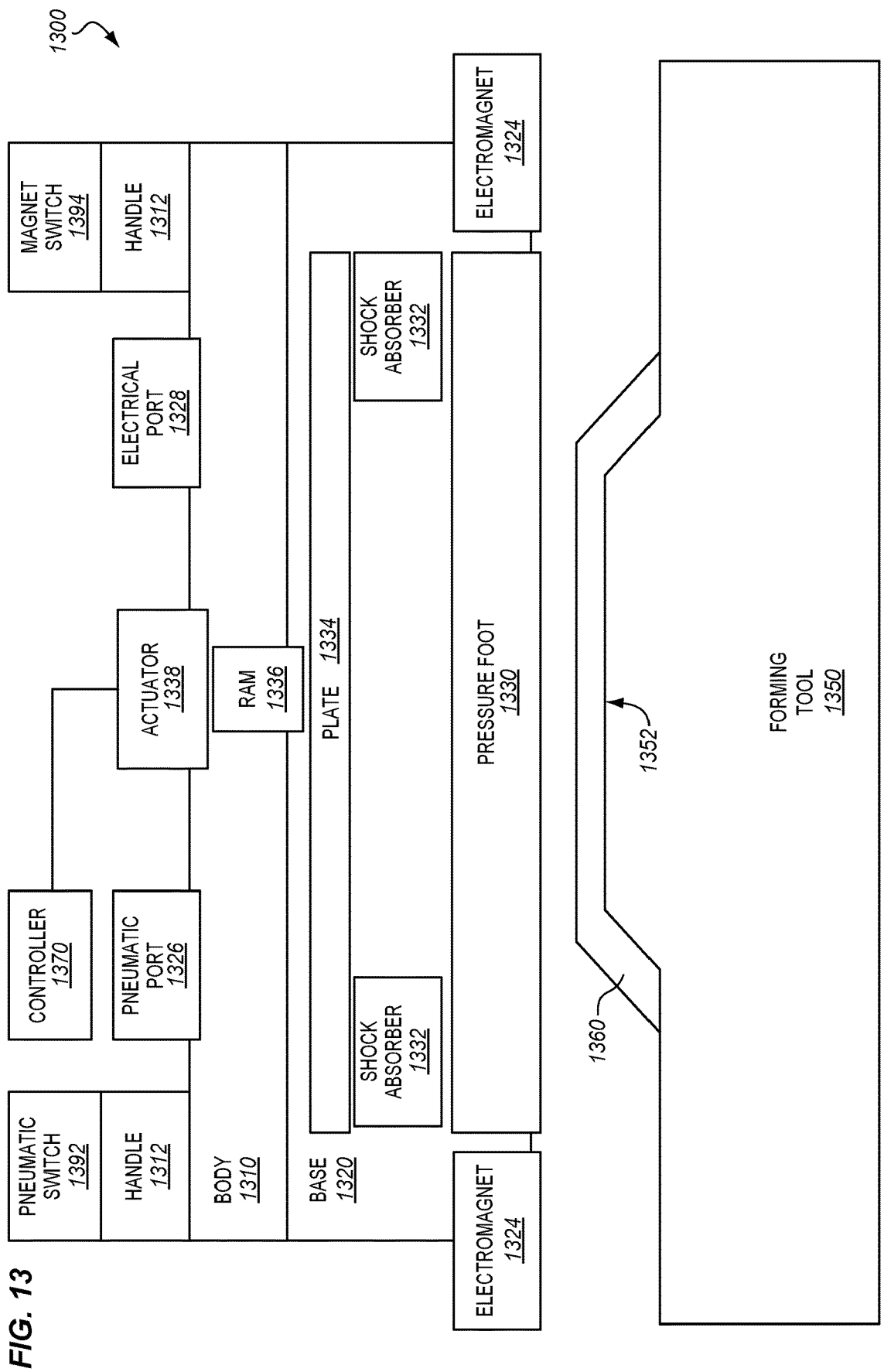
FIG. 13 is a block diagram of a compaction device in an illustrative embodiment.

FIG. 13 is a block diagram of a compaction device 1300 in an illustrative embodiment. According to FIG. 13, compaction device 1300 is poised over laminate 1360, which has been placed onto surface feature 1352 of forming tool 1350.

Compaction device 1300 includes base 1320, having electromagnets 1324 which magnetically couple with forming tool 1350 at locations not covered by laminate 1360. Base 1320 also includes pressure foot 1330, shock absorbers 1332, and plate 1334. These components are driven by ram 1336, which is driven by actuator 1338 powered via pneumatic port 1326. As discussed above, while pneumatic pressure systems are described herein, in further embodiments any suitable system may be utilized for driving ram 350. Body 1310 includes handles 1312, pneumatic port 1326, and electrical port 1328. Pneumatic port 1326 powers the actuator 1338, and electrical port 1328 powers the electromagnets 1324. Magnet switch 1394 controls delivery of power via electrical port 1328, and pneumatic switch 1322 controls delivery of pneumatic pressure to actuator 1338. Controller 1370 may automatically control the operations of the switches, ports, actuators, etc. described herein. For example, controller 1370 may maintain a static equilibrium between gripping forces and compressive forces to ensure that compaction of the laminate does not push compaction device 1300 off of forming tool 1350. Controller 1370 may further control the compaction forces by controlling an amount of force applied by ram 1336 to pressure foot 1330, which contacts the laminate 1360. For example, this may be performed to ensure that compaction forces are less than or equal to gripping forces. Controller 1370 may comprise a hardware processor implementing instructions in memory, dedicated hardware, etc.

Figure 14:
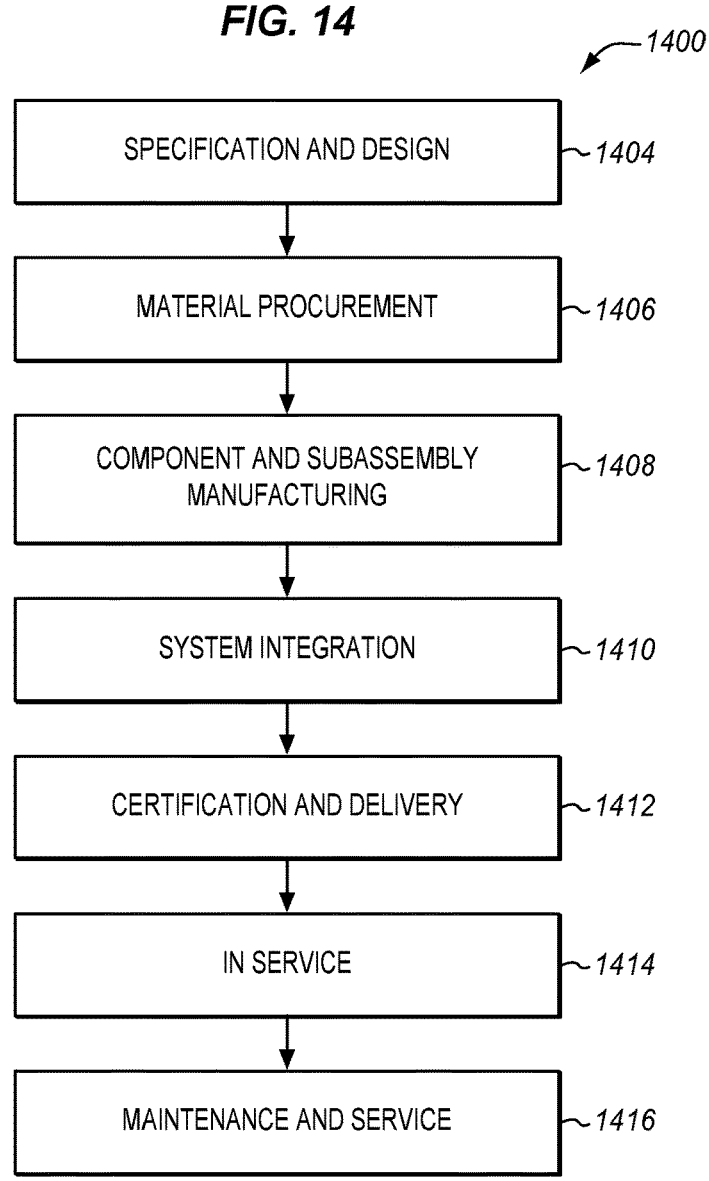
FIG. 14 is a flow diagram of aircraft production and service methodology in an illustrative embodiment.
Figure 15:
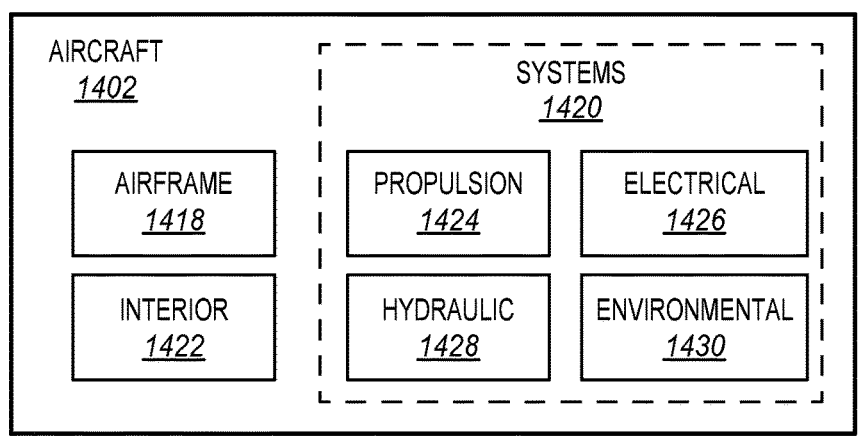
FIG. 15 is a block diagram of an aircraft in an illustrative embodiment.

Referring more particularly to the drawings, embodiments of the disclosure may be described in the context of aircraft manufacturing and service in method 1400 as shown in FIG. 14 and an aircraft 1402 as shown in FIG. 15. During pre-production, method 1400 may include specification and design 1404 of the aircraft 1402 and material procurement 1406. During production, component and subassembly manufacturing 1408 and system integration 1410 of the aircraft 1402 takes place. Thereafter, the aircraft 1402 may go through certification and delivery 1412 in order to be placed in service 1414. While in service by a customer, the aircraft 1402 is scheduled for routine work in maintenance and service 1416 (which may also include modification, reconfiguration, refurbishment, and so on). Apparatus and methods embodied herein may be employed during any one or more suitable stages of the production and service described in method 1400 (e.g., specification and design 1404, material procurement 1406, component and subassembly manufacturing 1408, system integration 1410, certification and delivery 1412, service 1414, maintenance and service 1416) and/or any suitable component of aircraft 1402 (e.g., airframe 1418, systems 1420, interior 1422, propulsion system 1424, electrical system 1426, hydraulic system 1428, environmental 1430).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 1402 produced by method 1400 may include an airframe 1418 with a plurality of systems 1420 and an interior 1422. Examples of systems 1420 include one or more of a propulsion system 1424, an electrical system 1426, a hydraulic system 1428, and an environmental system 1430. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1400. For example, components or subassemblies corresponding to component and subassembly manufacturing 1408 may be fabricated or manufactured in a manner similar to components or subassemblies produced while the aircraft 1402 is in service. Also, one or more apparatus embodiments, method embodiments, or a combination thereof may be utilized during the subassembly manufacturing 1408 and system integration 1410, for example, by substantially expediting assembly of or reducing the cost of an aircraft 1402. Similarly, one or more of apparatus embodiments, method embodiments, or a combination thereof may be utilized while the aircraft 1402 is in service, for example and without limitation during the maintenance and service 1416. For example, the techniques and systems described herein may be used for material procurement 1406, component and subassembly manufacturing 1408, system integration 1410, service 1414, and/or maintenance and service 1416, and/or may be used for airframe 1418 and/or interior 1422. These techniques and systems may even be utilized for systems 1420, including, for example, propulsion system 1424, electrical system 1426, hydraulic 1428, and/or environmental system 1430.

In one embodiment, a part comprises a portion of airframe 1418, and is manufactured during component and subassembly manufacturing 1408. The part may then be assembled into an aircraft in system integration 1410, and then be utilized in service 1414 until wear renders the part unusable. Then, in maintenance and service 1416, the part may be discarded and replaced with a newly manufactured part. Inventive components and methods may be utilized throughout component and subassembly manufacturing 1408 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for compacting a laminate onto a surface of a forming tool, the method comprising:
placing the laminate onto the forming tool;
aligning a pressure foot of a compaction device over the laminate, wherein the compaction device is distinct from the forming tool;
rotating electromagnets of the compaction device into alignment with a surface of the forming tool;
gripping the compaction device directly to the surface of the forming tool prior to initiating compaction of the laminate, by activating the electromagnets;
compacting the laminate with the pressure foot of the compaction device while the electromagnets remain activated, wherein the pressure foot is operated independently of the electromagnets; and
removing the compaction device from the forming tool.

2. The method of claim 1 further comprising:
activating the electromagnets via a switch.

3. The method of claim 2 wherein:
the forming tool is magnetic; and
gripping the compaction device to the forming tool comprises activating the electromagnets within the compaction device to draw the compaction device into contact with the forming tool.

4. The method of claim 2 wherein:
the compaction device is magnetic; and
gripping the compaction device to the forming tool further comprises activating electromagnets within the forming tool that draw the compaction device into contact with the forming tool.

5. The method of claim 1 wherein:
the pressure foot is driven in response to pneumatic pressure applied to the compaction device, and completely covers the laminate.

6. The method of claim 1 wherein:
driving the pressure foot comprises actuating a ram at the compaction device that is mechanically coupled with the pressure foot.

7. The method of claim 6 wherein:
actuating the ram compresses shock absorbers that are mechanically coupled with the pressure foot and that distribute load across the pressure foot.

8. The method of claim 7 further comprising:
adjusting an angle of a plate that is interposed between the shock absorbers and the ram, as the pressure foot is driven.

9. The method of claim 1 wherein:
compacting the laminate comprises driving the pressure foot, and the pressure foot is made of a flexible material.

10. A portion of an aircraft assembled according to the method of claim 1.

11. A non-transitory computer readable medium embodying programmed instructions which, when executed by a processor, are operable for performing a method for compacting a laminate onto a surface of a forming tool, the method comprising:
placing the laminate onto the forming tool;

aligning a pressure foot of a compaction device over the laminate, wherein the compaction device is distinct from the forming tool;

rotating electromagnets of the compaction device into alignment with a surface of the forming tool;

gripping the compaction device directly to the surface of the forming tool prior to initiating compaction of the laminate, by activating the electromagnets;

compacting the laminate with the pressure foot of the compaction device while the electromagnets remain activated, wherein the pressure foot is operated independently of the electromagnets; and removing the compaction device from the forming tool.

12. A portion of an aircraft assembled according to the method defined by the instructions stored on the computer readable medium of claim 11.

13. A method for laying up a composite preform, the method comprising:

placing a laminate comprising at least one ply of fiber reinforced material onto a surface of a forming tool;

aligning a pressure foot of a compaction device over the laminate, wherein the compaction device is distinct from the forming tool;

rotating electromagnets of the compaction device into alignment with a surface of the forming tool;

applying gripping forces directly between the compaction device and the forming tool prior to initiating compaction of the laminate, by activating the electromagnets;

compacting the laminate to the forming tool by controllably applying compaction forces to the laminate via the pressure foot while maintaining the gripping forces via the electromagnets;

laying up at least one ply atop the compacted laminate at the forming tool; and repeating the steps of compacting and placing.

14. The method of claim 13 wherein:

compacting the laminate is performed while at atmospheric pressure.

15. The method of claim 13 further comprising:

activating the electromagnets via a switch.

16. The method of claim 13 wherein:

the forming tool is magnetic; and maintaining gripping forces comprises activating the electromagnets within the compaction device to draw the compaction device into contact with the forming tool.

17. The method of claim 13 wherein:

the compaction device is magnetic; and maintaining gripping forces further comprises activating electromagnets within the forming tool that draw the compaction device into contact with the forming tool.

18. The method of claim 13 further comprising:

controlling the compaction forces by controlling an amount of force applied by a ram to the pressure foot while the pressure foot contacts the laminate.

19. The method of claim 18 wherein:

the amount of force applied by the ram is controlled to be less than or equal to the gripping forces.

20. The method of claim 18 further comprising:

receiving force applied by the ram at shock absorbers; and distributing the force across the pressure foot via the shock absorbers.

* * * * *